US007882180B2

(12) United States Patent
Ikeno

(10) Patent No.: US 7,882,180 B2
(45) Date of Patent: Feb. 1, 2011

(54) MONITORING APPARATUS FOR IMAGE FORMING APPARATUS, CONTROL METHOD EXECUTED BY THE MONITORING APPARATUS, PROGRAM FOR IMPLEMENTING THE CONTROL METHOD, AND MANAGEMENT APPARATUS, CONTROL METHOD EXECUTED BY THE MANAGEMENT APPARATUS, AND PROGRAM FOR IMPLEMENTING THE CONTROL METHOD

(75) Inventor: Hideo Ikeno, Kanagawa (JP)

(73) Assignee: Canon Kabushiki Kaisha (JP)

( * ) Notice: Subject to any disclaimer, the term of this patent is extended or adjusted under 35 U.S.C. 154(b) by 1547 days.

(21) Appl. No.: 10/755,032

(22) Filed: Jan. 9, 2004

(65) Prior Publication Data

US 2004/0205140 A1 Oct. 14, 2004

(30) Foreign Application Priority Data

Jan. 10, 2003 (JP) ............................. 2003-005155
Dec. 26, 2003 (JP) ............................. 2003-435644

(51) Int. Cl.
 *G06F 15/16* (2006.01)
(52) U.S. Cl. ........................ 709/206; 709/200; 709/223; 709/224; 717/168; 717/170; 717/177; 715/229
(58) Field of Classification Search ................. 709/223, 709/206, 220, 202, 221, 224; 717/168, 174, 717/11, 170, 177; 702/188; 714/4; 715/229
 See application file for complete search history.

(56) References Cited

U.S. PATENT DOCUMENTS

| | | | | |
|---|---|---|---|---|
| 5,835,911 A | * | 11/1998 | Nakagawa et al. | 707/203 |
| 5,884,325 A | * | 3/1999 | Bauer et al. | 1/1 |
| 6,098,098 A | * | 8/2000 | Sandahl et al. | 709/221 |
| 6,202,207 B1 | * | 3/2001 | Donohue | 717/173 |
| 6,353,926 B1 | * | 3/2002 | Parthesarathy et al. | 717/170 |
| 6,467,087 B1 | * | 10/2002 | Yang | 717/168 |
| 6,678,888 B1 | * | 1/2004 | Sakanishi | 717/172 |
| 6,751,794 B1 | * | 6/2004 | McCaleb et al. | 717/168 |
| 6,892,320 B1 | * | 5/2005 | Roush | 714/15 |
| 6,954,720 B2 | * | 10/2005 | Oya | 702/188 |
| 7,065,560 B2 | * | 6/2006 | Erickson et al. | 709/219 |
| 7,146,412 B2 | * | 12/2006 | Turnbull | 709/220 |

(Continued)

FOREIGN PATENT DOCUMENTS

JP           11-15647 A          1/1999

(Continued)

*Primary Examiner*—John Follansbee
*Assistant Examiner*—Anthony Mejia
(74) *Attorney, Agent, or Firm*—Rossi, Kimms & McDowell LLP

(57) ABSTRACT

There is provided a monitoring apparatus which makes it possible to efficiently update modules on which the monitoring apparatus operates by remote control from a management apparatus. The monitoring apparatus carries out communication with the management apparatus by e-mail. When the monitoring apparatus receives other modules for updating the modules in the monitoring apparatus from the management apparatus by e-mail, the monitoring apparatus automatically updates the modules to the other modules. The monitoring apparatus collects version information on the modules when receiving a version information acquisition request from the management apparatus by e-mail. The monitoring apparatus sends the collected version information to the management apparatus by return mail.

2 Claims, 14 Drawing Sheets

U.S. PATENT DOCUMENTS

| | | | |
|---|---|---|---|
| 7,266,840 B2 * | 9/2007 | Gruber | 726/9 |
| 7,395,324 B1 * | 7/2008 | Murphy et al. | 709/223 |
| 7,458,074 B2 * | 11/2008 | Dull et al. | 717/169 |
| 7,555,657 B2 * | 6/2009 | Nasu | 713/191 |
| 7,707,571 B1 * | 4/2010 | Harris et al. | 717/177 |
| 2001/0029529 A1 * | 10/2001 | Tachibana et al. | 709/220 |
| 2001/0042102 A1 * | 11/2001 | Inamori et al. | 709/206 |
| 2002/0026324 A1 | 2/2002 | Okada | |
| 2002/0040389 A1 * | 4/2002 | Gerba et al. | 709/219 |
| 2002/0087668 A1 * | 7/2002 | San Martin et al. | 709/221 |
| 2002/0099782 A1 * | 7/2002 | Bando et al. | 709/206 |
| 2002/0129107 A1 * | 9/2002 | Loughran et al. | 709/206 |
| 2003/0005351 A1 * | 1/2003 | Lim | 714/4 |
| 2003/0086122 A1 * | 5/2003 | Parry | 358/402 |
| 2003/0135613 A1 * | 7/2003 | Yoshida et al. | 709/224 |
| 2003/0217124 A1 * | 11/2003 | Parry | 709/220 |
| 2004/0103411 A1 * | 5/2004 | Thayer | 717/171 |
| 2004/0148379 A1 * | 7/2004 | Ogura | 709/223 |
| 2004/0150851 A1 * | 8/2004 | Sato | 358/1.13 |
| 2004/0205140 A1 * | 10/2004 | Ikeno | 709/206 |
| 2004/0215755 A1 * | 10/2004 | O'Neill | 709/223 |
| 2004/0249934 A1 * | 12/2004 | Anderson et al. | 709/224 |
| 2005/0027807 A1 * | 2/2005 | Fengler et al. | 709/206 |
| 2005/0066019 A1 * | 3/2005 | Egan et al. | 709/223 |
| 2006/0244986 A1 * | 11/2006 | Ferlitsch | 358/1.13 |

FOREIGN PATENT DOCUMENTS

| | | |
|---|---|---|
| JP | 2000322244 (A) | 11/2000 |
| JP | 2002-73954 A | 3/2002 |
| JP | 2002-189599 A | 7/2002 |
| JP | 2002-297390 A | 10/2002 |

* cited by examiner

| | 1101 | 1102 | |
|---|---|---|---|
| Software Version | | 1.0.00-1 | |
| ROM Version | | 1.5.08 | |
| ---Modules--- | | | |
| abcd.exe | | 1.0.00 | 2002/01/01 |
| bbb.lib | | 1.3.05 | 2002/11/29 |
| main.cgi | | 1.0.00 | 2002/01/01 |
| refresh | | 1.0.00 | 2002/01/01 |
| agent_sweeprr | | 2.0.00 | 2002/08/07 |
| time_shell.sh | | 1.1.01 | 2002/11/22 |

FIG.15

RDS Agent VersionManager

FILE(F) COMMAND(C)

update to : 1.0.02-0

| RDS Agent ID | MAIL ADDRESS | VERSION | DATE OF LATEST VERSION CHECK | REMARKS |
|---|---|---|---|---|
| AGENT0000001 | agent@aaa.co.jp | 1.0.00-1 | 02/11/03 15:25 | aaa TRADING Co., Ltd. |
| AGENT0000002 | agent@bbb.co.jp | 1.0.00-1 | 02/11/03 15:26 | bbb ELECTRIC Co., Ltd. |
| AGENT0000003 | agent@ccc.co.jp | 1.0.00-1 | 02/11/03 15:26 | ccc INDUSTRY Co., Ltd. |
| AGENT0000004 | agent@ddd.co.jp | 1.0.00-1 | 02/11/03 15:26 | ddd CONSTRUCTION Co., Ltd. |
| AGENT0000005 | agent@eee.co.jp | 1.0.00-1 | 02/11/03 15:26 | eee BANK |
| AGENT0000006 | agent@fff.co.jp | 1.0.00-1 | 02/11/03 15:26 | fff INSURANCE |
| AGENT0000007 | agent@ggg.co.jp | 1.0.00-1 | 02/11/03 15:26 | ggg GENERAL INSURANCE |
| AGENT0000008 | agent@hhh.co.jp | 1.0.00-1 | 02/11/03 15:26 | hhh FOUNDATION |
| AGENT0000009 | agent@iii.co.jp | 1.0.00-1 | 02/11/03 15:26 | iii FOODS Co., Ltd. |
| AGENT0000010 | agent@jjj.co.jp | 1.0.02-1 | 02/11/03 15:26 | jjj DEPARTMENT STORE |
| AGENT0000011 | agent@kkk.co.jp | 1.0.00-1 | 02/11/03 15:26 | kkk COMMUNICATIONS (1F) |
| AGENT0000012 | agent2@kkk.co.jp | 1.0.00-1 | 02/11/03 15:26 | kkk COMMUNICATIONS (2F) |
| AGENT0000013 | agent3@kkk.co.jp | 1.0.00-1 | 02/11/03 15:26 | kkk COMMUNICATIONS (3F) |
| AGENT0000014 | agent@lll.co.jp | 1.0.00-1 | 02/11/03 15:26 | lll MOTORS Co., Ltd. |
| AGENT0000015 | agent@mmm.co.jp | 1.0.01-1 | 02/11/03 15:26 | mmm CITY CENTER (CITIZEN DEPARTMENT) |
| AGENT0000016 | agent2@mmm.co.jp | 1.0.01-1 | 02/11/03 15:26 | mmm CITY CENTER(TAX PAYMENT DEPARTMENT) |
| AGENT0000017 | agent@nnn.co.jp | 1.0.00-1 | 02/11/03 15:26 | nnn PLANNING Co., Ltd. |

FIG.16

RDS Agent VersionManager

FILE(F) COMMAND(C)

update to : 1.0.02-0 — 1404

| RDS Agent ID | MAIL ADDRESS | VERSION | DATE OF LATEST VERSION CHECK | REMARKS |
|---|---|---|---|---|
| AGENT00000001 | agent@aaa.co.jp | 1.0.02-0 | 02/11/22 00:11 | aaa TRADING Co., Ltd. |
| ✓ AGENT00000002 | agent@bbb.co.jp | 1.0.00-1 | 02/11/03 15:26 | bbb ELECTRIC Co., Ltd. |
| AGENT00000003 | agent@ccc.co.jp | 1.0.02-0 | 02/11/22 00:32 | ccc INDUSTRY Co., Ltd. |
| AGENT00000004 | agent@ddd.co.jp | 1.0.02-0 | 02/11/22 00:40 | ddd CONSTRUCTION Co., Ltd. |
| AGENT00000005 | agent@eee.co.jp | 1.0.02-0 | 02/11/22 00:54 | eee BANK |
| AGENT00000006 | agent@fff.co.jp | 1.0.02-0 | 02/11/22 01:01 | fff INSURANCE |
| AGENT00000007 | agent@ggg.co.jp | 1.0.02-0 | 02/11/03 15:26 | ggg GENERAL INSURANCE |
| AGENT00000008 | agent@hhh.co.jp | 1.0.02-0 | 02/11/22 01:12 | hhh FOUNDATION |
| AGENT00000009 | agent@iii.co.jp | 1.0.02-0 | 02/11/22 00:18 | iii FOODS Co., Ltd. |
| ✓ AGENT00000010 | agent@jjj.co.jp | 1.0.02-1 | 02/11/03 15:26 | jjj DEPARTMENT STORE |
| AGENT00000011 | agent@kkk.co.jp | 1.0.02-0 | 02/11/22 00:33 | kkk COMMUNICATIONS (1F) |
| AGENT00000012 | agent2@kkk.co.jp | 1.0.02-0 | 02/11/22 00:29 | kkk COMMUNICATIONS (2F) |
| AGENT00000013 | agent3@kkk.co.jp | 1.0.02-0 | 02/11/22 00:47 | kkk COMMUNICATIONS (3F) |
| AGENT00000014 | agent@lll.co.jp | 1.0.02-0 | 02/11/22 00:55 | lll MOTORS Co., Ltd. |
| ✓ AGENT00000015 | agent@mmm.co.jp | 1.0.00-1 | 02/11/03 15:26 | mmm CITY CENTER (CITIZEN DEPARTMENT) |
| AGENT00000016 | agent2@mmm.co.jp | 1.0.02-0 | 02/11/22 00:38 | mmm CITY CENTER(TAX PAYMENT DEPARTMENT) |
| AGENT00000017 | agent@nnn.co.jp | 1.0.02-0 | 02/11/22 01:02 | nnn PLANNING Co., Ltd. |

MONITORING APPARATUS FOR IMAGE FORMING APPARATUS, CONTROL METHOD EXECUTED BY THE MONITORING APPARATUS, PROGRAM FOR IMPLEMENTING THE CONTROL METHOD, AND MANAGEMENT APPARATUS, CONTROL METHOD EXECUTED BY THE MANAGEMENT APPARATUS, AND PROGRAM FOR IMPLEMENTING THE CONTROL METHOD

BACKGROUND OF THE INVENTION

1. Field of the Invention

The present invention relates to a monitoring apparatus for image forming apparatuses, a control method executed by the monitoring apparatus, and a program for implementing the control method, as well as to a management apparatus, a control method executed by the management apparatus, and a program for implementing the control method. In particular, the present invention relates to a monitoring apparatus which monitors at least one image forming apparatus (in particular, an office printer such as a multi-function copying machine), collects information on the image forming apparatus, and sends the information to a management server (management apparatus), a control method executed by the monitoring apparatus, and a program for implementing the control method, as well as to a management apparatus which manages at least one monitoring apparatus and collects information on the monitoring apparatus, a control method executed by the management apparatus, and a program for implementing the control method.

2. Description of the Related Art

Conventionally, there has been a remote monitoring system which is constructed such that an apparatus (host) having an information processing function and monitoring apparatuses communicate with each other via a communication medium, and which remotely monitors the status of an apparatus such as a copying machine via the monitoring apparatus. For this type of remote monitoring system, there has been a method in which modules (programs) in each monitoring apparatus installed at a remote location, on which modules the monitoring apparatus operates, are remotely updated (version update). In this case, in the state in which the host and the monitoring apparatus whose modules are to be updated are connected to each other such that they can communicate with each other, update data is transferred without fail to update modules within the monitoring apparatus, then it is ascertained whether or not the modules have been updated to desired modules, and then the host and the monitoring apparatuses are disconnected from each other.

It should be noted that various proposals has been made as examples of the above described prior art (refer to Japanese Laid-Open Patent Publication (Kokai) No. 2000-322244, for example).

The conventional remote monitoring system described above, however, is encountered with problems as below. In the remote monitoring system, since the host manages a plurality of monitoring apparatuses, whenever modules within each monitoring apparatus are to be updated, the host has to connect with the plurality of monitoring apparatuses one by one so as to communicate with them, which is very complicated and requires much time. Therefore, smooth update is difficult according to the prior art.

SUMMARY OF THE INVENTION

It is therefore an object of the present invention to provide a monitoring apparatus, a control method executed by the monitoring apparatus, and a program for implementing the control method, which make it possible to efficiently update modules, on which the monitoring apparatus operates, by remote control from a management apparatus, as well as to the management apparatus, a control method executed by the management apparatus, and a program for implementing the control method.

To attain the above object, in a first aspect of the present invention, there is provided a monitoring apparatus capable of acquiring information by communication from at least one image forming apparatus to be monitored and communicating with a management apparatus, comprising an e-mail device that carries out communication with the management apparatus by e-mail, a processing device operable when the e-mail device has received second modules for updating first modules, on which the monitoring apparatus operates, from the management apparatus by e-mail, to automatically update the first modules in operation to the second modules, an information collecting device that collects version information on the first modules when the e-mail device has received a version information acquisition request from the management apparatus by e-mail, and a returning device that sends the version information collected by the information collecting device to the management apparatus by return e-mail.

Preferably, the monitoring apparatus further comprises a receiving device that receives an update instruction e-mail containing at least the second modules and an install script, and an acquisition request e-mail requesting acquisition of the version information indicative of versions of respective ones of the first modules in the monitoring apparatus and a version of the monitoring apparatus as a whole, the processing device activates the install script contained in the update instruction e-mail received by the receiving device, and updates the first modules in operation to the second modules contained in the update instruction e-mail received by the receiving device, and the information collecting device collects the version information in response to the acquisition request e-mail received by the receiving device, and the returning device sends the version information collected by the information collecting device to the management apparatus by return e-mail.

Also preferably, the monitoring apparatus comprises a decoding device that decodes contents of an e-mail received by the e-mail device, and wherein the processing device interprets an instruction from the management apparatus from the contents of the received e-mail decoded by the decoding device, and performs processing according to the interpreted contents of the e-mail.

To attain the above object, in a second aspect of the present invention, there is provided a management apparatus capable of managing a plurality of monitoring apparatuses that acquire information by communication from a plurality of image forming apparatuses to be monitored, comprising an instructing device that collectively instructs the plurality of monitoring apparatuses to update first modules, on which the plurality of monitoring apparatuses operate, to second modules by e-mail, an acquisition requesting device that collectively gives a request for acquisition of version information on the first modules to the plurality of monitoring apparatuses by e-mail, and an acquisition device that acquires the version information from the plurality of monitoring apparatuses as replies to e-mails for requesting acquisition of the version information sent by the acquisition requesting device.

Preferably, the instructing device collectively transmits update instruction e-mails containing at least the second modules for updating the first modules of respective ones of the plurality of monitoring apparatuses and an install script to the plurality of monitoring apparatuses, the acquisition requesting device collectively transmits acquisition request e-mails for requesting acquisition of version information indicative of versions of respective ones of the modules in each of the plurality of monitoring apparatuses and a version of each of the plurality of monitoring apparatuses as a whole to the plurality of monitoring apparatuses, and the acquisition device receives the version information from the plurality of monitoring apparatuses as replies to the acquisition request e-mails transmitted by the acquisition requesting device.

Also preferably, the management apparatus comprises a determining device that compares version information indicative of versions of the first modules to be taken after update of the first modules in accordance with an instruction for updating the first modules to the second modules with the version information acquired by the acquisition device to determine whether the first modules have been successfully updated.

More preferably, the instructing device collectively instructs the monitoring apparatuses to update the first modules when the determining device ascertains that the modules have not been successfully updated.

Also more preferably, the version information indicative of versions of the first modules to be taken after update of the first modules is second version information indicative of a version of each of the plurality of monitoring apparatuses as a whole, and the second version information corresponds to a combination of the first modules in each of the plurality of monitoring apparatuses.

To attain the above object, in a third aspect of the present invention, there is provided a control method executed by a monitoring apparatus capable of acquiring information by communication from at least one image forming apparatus to be monitored, and communicating with a management apparatus, comprising a communication step of carrying out communication with the management apparatus by e-mail, a processing step of automatically updating first modules in operation, on which the monitoring apparatus operates, to second modules for updating the first modules when the second modules is received from the management apparatus by e-mail in the communication step, an information collecting step of collecting version information on the first modules when a version information acquisition request is received from the management apparatus by e-mail in the communication step, and a returning step of sending the version information collected in the information collecting step to the management apparatus by return mail.

Preferably, the control method further comprises a receiving step of receiving an update instruction e-mail containing at least the second modules and an install script, and an acquisition request e-mail requesting acquisition of the version information indicative of versions of respective ones of the modules in the monitoring apparatus and a version of the monitoring apparatus as a whole, the processing step comprises activating the install script contained in the update instruction e-mail received in the receiving step, and updating the first modules in operation to the second modules contained in the update instruction e-mail received in the receiving step, and the information collecting step comprises collecting the version information in response to the acquisition request e-mail received in the receiving step, and the returning step comprises sending the version information collected in the information collecting step to the management apparatus by return e-mail.

Also preferably, the control method comprises a decoding step of decoding contents of an e-mail received in the communication step, and wherein the processing step comprises interpreting an instruction from the management apparatus from the contents of the received e-mail decoded in the decoding step, and performing processing according to the interpreted contents of the e-mail.

To attain the above object, in a fourth aspect of the present invention, there is provided a control method executed by a management apparatus capable of managing a plurality of monitoring apparatuses that acquire information by communication from a plurality of image forming apparatuses to be monitored, comprising an instructing step of collectively instructing the plurality of monitoring apparatus to update first modules, on which the plurality of monitoring apparatuses operate, to second modules by e-mail, an acquisition requesting step of collectively giving a request for acquisition of version information on the first modules to the plurality of monitoring apparatuses by e-mail, and an acquisition step of acquiring the version information from the plurality of monitoring apparatuses as replies to e-mails for requesting acquisition of the version information sent in the acquisition requesting step.

Preferably, the instructing step comprises collectively transmitting update instruction e-mails containing at least the second modules for updating the first modules of respective ones of the plurality of monitoring apparatuses and an install script to the plurality of monitoring apparatuses, the acquisition requesting step comprises collectively transmitting acquisition request e-mails for requesting acquisition of version information indicative of versions of respective ones of the modules in each of the plurality of monitoring apparatuses and a version of each of the plurality of monitoring apparatuses as a whole to the plurality of monitoring apparatuses, and the acquisition step comprises receiving the version information from the plurality of monitoring apparatuses as replies to the acquisition request e-mails transmitted in the acquisition requesting step.

Also preferably, the control method comprises a determining step of comparing version information indicative of versions of the first modules to be taken after update of the first modules in accordance with an instruction for updating the first modules to the second modules with the version information acquired in the acquisition step to determine whether the first modules have been successfully updated.

Also preferably, the instructing step comprises collectively instructing the monitoring apparatuses to update the first modules when it is determined in the determining step that the first modules have not been successfully updated.

More preferably, the version information indicative of versions of the first modules to be taken after update of the first modules is second version information indicative of a version of each of the plurality of monitoring apparatuses as a whole, and the second version information corresponds to a combination of the first modules in each of the plurality of monitoring apparatuses.

To attain the above object, in a fifth aspect of the present invention, there is provided a program for causing a computer to execute a control method implemented by a monitoring apparatus capable of acquiring information by communication from at least one image forming apparatus to be monitored, and communicating with a management apparatus, the method comprising a communication step of carrying out communication with the management apparatus by e-mail, a processing step of automatically updating first modules in operation, on which the monitoring apparatus operates, to second modules for updating the first modules when the second modules for updating the modules is received from the management apparatus by e-mail in the communication step, an information collecting step of collecting version information on the first modules when a version information acquisition request is received from the management apparatus by e-mail in the communication step, and a returning step of sending the version information collected in the information collecting step to the management apparatus by return mail.

To attain the above object, in a sixth aspect of the present invention, there is provided a program for causing a computer to execute a control method implemented by a management apparatus capable of managing a plurality of monitoring apparatuses that acquire information by communication from a plurality of image forming apparatuses to be monitored, the method comprising an instructing step of collectively instructing the plurality of monitoring apparatuses to update first modules, on which the plurality of monitoring apparatuses operate, to second modules by e-mail, an acquisition requesting step of collectively giving a request for acquisition of version information on the first modules to the plurality of monitoring apparatuses, and an acquisition step of acquiring the version information from the plurality of monitoring apparatuses as replies to e-mails for requesting acquisition of the version information sent in the acquisition requesting step.

According to the present invention, modules on which each of the plurality of monitoring apparatuses managed by the management apparatus operates, can be collectively updated by remote control in an efficient manner. This eliminates the necessity of carrying out such a very complicated and a large volume of operation that the management apparatus connects to the monitoring apparatuses, whose modules are to be updated, one by one so as to communicate with them and update modules therein as in the prior art.

The above and other objects, features, and advantages of the invention will become more apparent from the following detailed description taken in conjunction with the accompanying drawings.

BRIEF DESCRIPTION OF THE DRAWINGS

FIG. 15 is a view showing a screen of a center side PC in FIG. 1 before the start of an uploading process in the collective update process in FIG. 14; and FIG. 16 is a view showing a screen of the center side PC in FIG. 1, the screen showing the result of uploading in the collective update process.

DETAILED DESCRIPTION OF THE PREFERRED EMBODIMENTS

The present invention will now be described in detail with reference to the accompanying drawings showing a preferred embodiment thereof.

Figure 1:
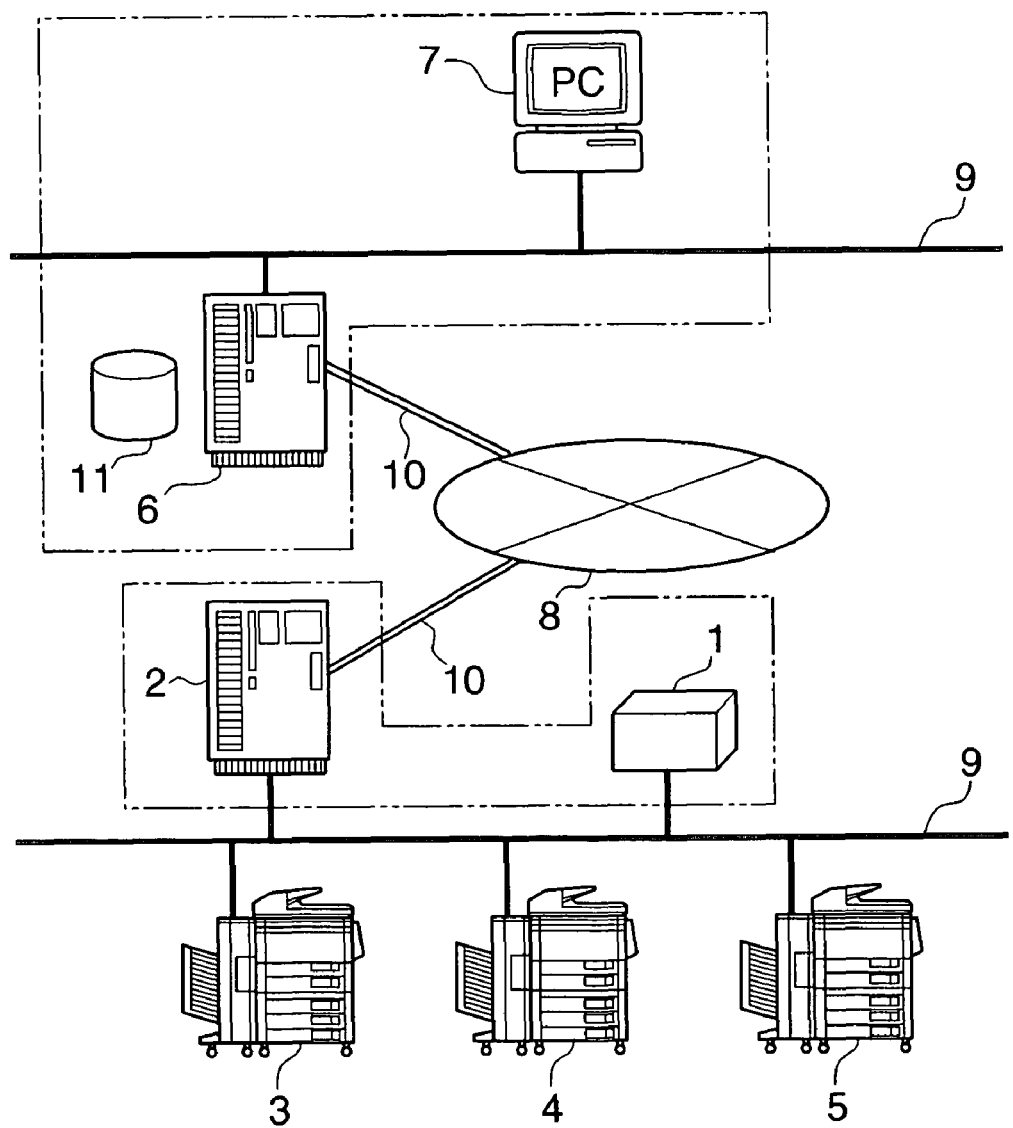
FIG. 1 is a diagram schematically showing an example of the entire construction of a device remote monitoring system including a monitoring apparatus and a management apparatus according to an embodiment of the present invention.

FIG. 1 is a schematic view showing an example of the overall construction of a device remote monitoring system including a monitoring apparatus and a management apparatus according to an embodiment of the present invention. The device remote monitoring system is comprised of a monitoring apparatus 1 as the monitoring apparatus according to the present invention, a terminal side management server 2, devices 3, 4, and 5, which may be each implemented by an image forming apparatus, a center side management server 6 as the management apparatus according to the present invention, a center side client PC 7, a communication line 8, and a LAN (Local Area Network) 9. Reference numeral 10 denotes a communication protocol.

In the device remote monitoring system, the center side management server 6 having at least a construction which a general information processing apparatus has is provided as a center side apparatus for supervising monitoring of the devices 3, 4, and 5. Further, there exist a database 11 for accumulating information, and the center side client PC 7 which is connected to the center side management server 6 via the LAN 9, and is operable independently or as a client of the center side management server 6. The center side management server 6 and the terminal side management server 2 are capable of communicating with each other via the communication line 8 such as the Internet using the predetermined communication protocol 10. In the present embodiment, a general protocol (such as SMTP (Simple Mail Transfer Protocol)) and an authentication function are also provided for preventing unauthorized access to the terminal side management server 2 and the center side management server 6 and getting over (passing through) a firewall provided on the network in the device remote monitoring system. It should be noted that although only one center side management server 6 is provided in the illustrated example, in the present embodiment it is assumed that a plurality of center side management servers 6 can be provided depending on intended purposes such as failure monitoring and counter information collection as described later.

On the other hand, on the terminal side of the device remote monitoring system, the terminal side management server 2 exists, and the monitoring apparatus 1 is connected to the LAN 9, for collecting information from the devices 3, 4, and 5 and personal computers, not shown. The monitoring apparatus 1 has a function of collecting maintenance information including operative information and failure information on the various devices 3, 4, and 5 with which the monitoring apparatus 1 can communicate via the LAN 9, a function of providing control to update control programs and the like for the devices 3, 4, and 5, and a function of transferring the collected information to the center side management server 6 via the terminal side management server 2.

It should be noted that insofar as information can be shared between the monitoring apparatus 1 and the terminal side management server 2, and between the center side client PC 7 and the center side management server 6, these apparatuses may be provided as independent apparatuses as in the present embodiment, or may be provided as single apparatuses having the respective functions of the apparatuses (a single apparatus having the respective functions of the monitoring apparatus 1 and the terminal side management server 2, and a single apparatus having the respective functions of the center side client PC 7 and the center side management server 6). This alternative arrangement is shown by two-dot chain lines in FIG. 1. In the following description, it is assumed that the monitoring apparatus 1 communicates with the external center side management server 6 via the terminal side management server 2, but the terminal side management server 2 may also have the functions of the monitoring apparatus 1. In the following description, it is assumed that the monitoring apparatus 1 and the center side management server 6 transmit and receive information between them.

Although only one monitoring apparatus 1 and only one terminal side management server 2 are shown in FIG. 1, in actuality, the device remote monitoring system is constructed such that a plurality of monitoring apparatuses 1, a plurality of terminal side management servers 2, and the center side management server 6 which centrally manages these monitoring apparatuses 1 and terminal side management servers 2 communicate with each other via the communication line 8.

Examples of the devices 3, 4, and 5 include a printer (such as an electrophotographic type printer or an ink jet type printer) as an image forming apparatus, a scanner as an image reading apparatus, a facsimile as an image communication apparatus, a digital multifunction apparatus as an image forming apparatus having a printer function and a facsimile function, a personal computer as an information processing apparatus, and a print server as an image processing apparatus. The image forming apparatus will be described later in further detail. Further, personal computers, not shown, are connected to the LAN 9 in the same manner as a computer 501 shown in FIG. 7, and have a function of generating PDL (Page Description Language) data from predetermined application data, for example, via an OS (Operating System) or a printer driver, and then transmitting the generated PDL data to the devices 3, 4, and 5 for output.

The monitoring apparatus 1 collects maintenance information including at least operative information such as operative statuses, the residual toner quantity, and the number of printed sheets counted for respective sheet sizes of the devices 3, 4, and 5 (such as a printer, a facsimile, and a multi-function machine), operative information including CPU status, memory utilization status, and usage of rental application programs of the personal computers, sheet jam information of the devices 3, 4, and 5, and various types of failure information including the number of restarts occurring in the personal computers.

Figure 2:
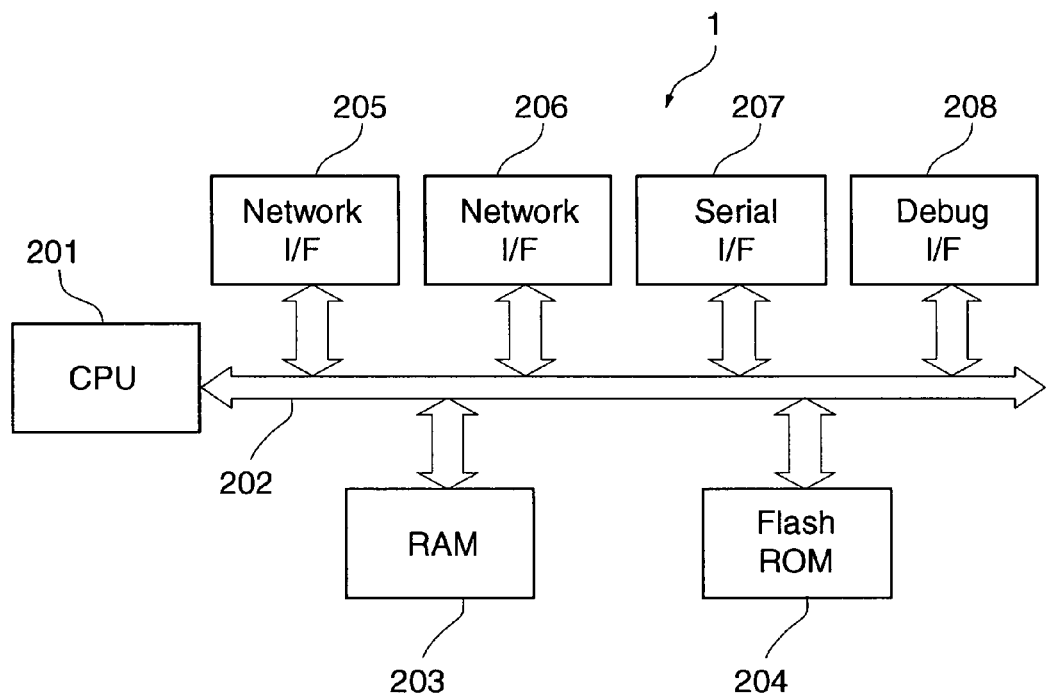
FIG. 2 is a block diagram showing the hardware construction of the monitoring apparatus in FIG. 1.

FIG. 2 is a block diagram showing the hardware construction of the monitoring apparatus 1 in FIG. 1. The monitoring apparatus 1 is comprised of a CPU 201, a bus 202, a RAM 203, and a flash ROM 204, as well as a plurality of interfaces (hereinafter simply referred to as "I/F") for various applications, namely, network I/Fs 205 and 206, a serial I/F 207, and a debug I/F 208, all of which are provided in an ordinary information processing apparatus.

The CPU 201 controls the respective component parts 203 to 208 independently and/or integrally, and carries out processes shown in flowcharts of FIGS. 3 to 6, 9, 15, and 16 according to programs stored in the flash ROM 204. The bus 202 is a common signal path for transmitting and receiving data between the component parts constituting the monitoring apparatus 1 in FIG. 2. The RAM 203 is a storage means that can electrically store information and is also rewritable. The flash ROM 204 is a non-volatile storage means that is electrically rewritable, and can also maintain information without power supply. The network I/Fs 205 and 206 exchange information with external apparatuses via the network. The serial I/F 207 exchange information by RS-232C serial communication. The debug I/F 208 is a serial communication section used for a debug application.

Although the monitoring apparatus 1 may be comprised of an input device such as a keyboard, a display section, and a display control section, and the like, the monitoring apparatus 1 permits its settings to be changed such that a PC carried by a service person, for example, is connected to the network I/F 205 or 206 of the monitoring apparatus 1 so that a configuration program stored within the monitoring apparatus 1 is started from the PC as described later. This can dispense with the provision of the input device, display section, and display control section, to thereby enable the monitoring apparatus 1 to be constructed at a low cost.

It suffices that the terminal side management server 2, the personal computers, not shown, the center side management server 6, and the center side client PC 7 appearing in FIG. 1 have the construction of an ordinary information processing apparatus, and detailed description thereof, therefore, is omitted.

Figure 3:
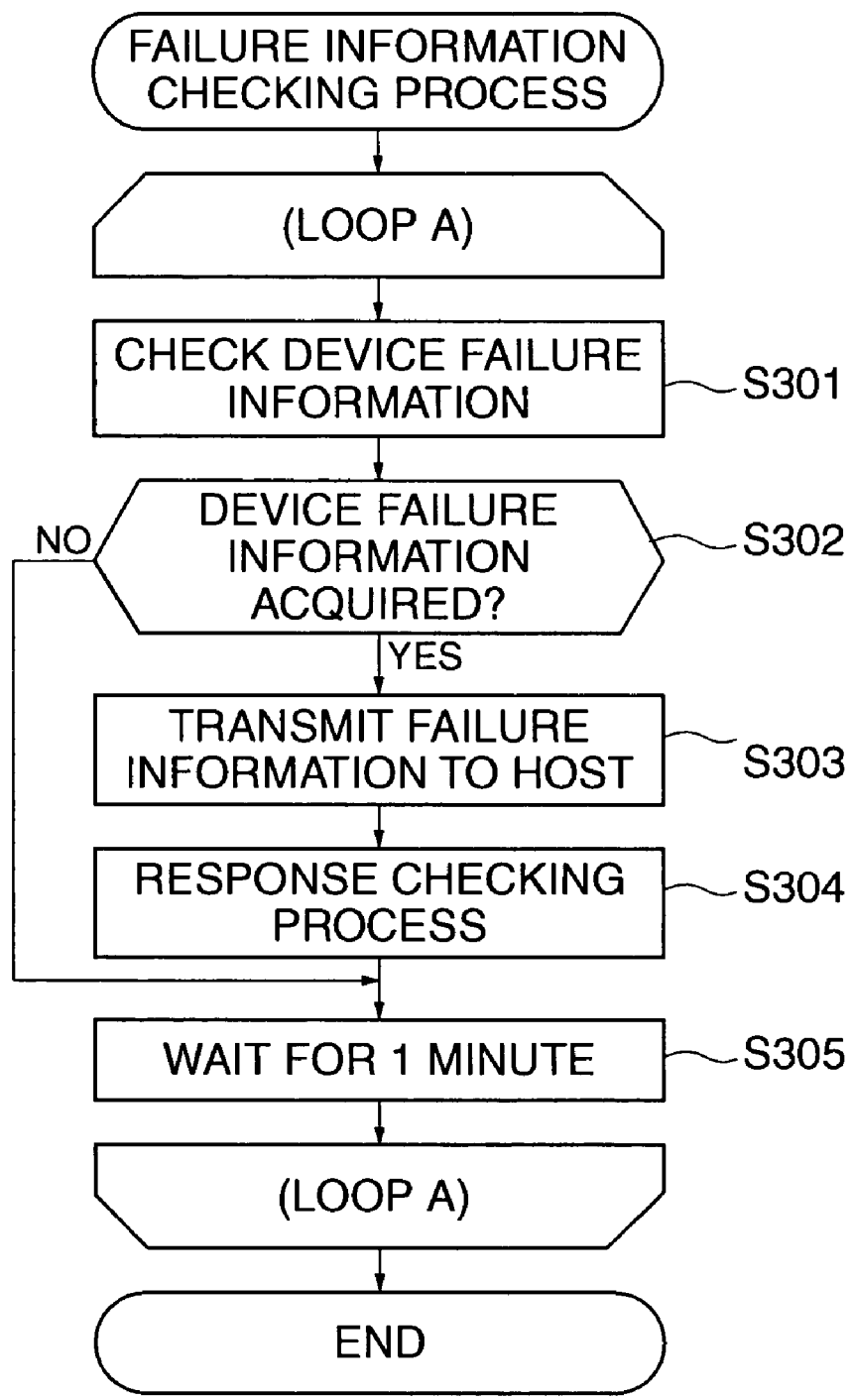
FIG. 3 is a flow chart showing a failure information checking process carried out by the monitoring apparatus.
Figure 4:
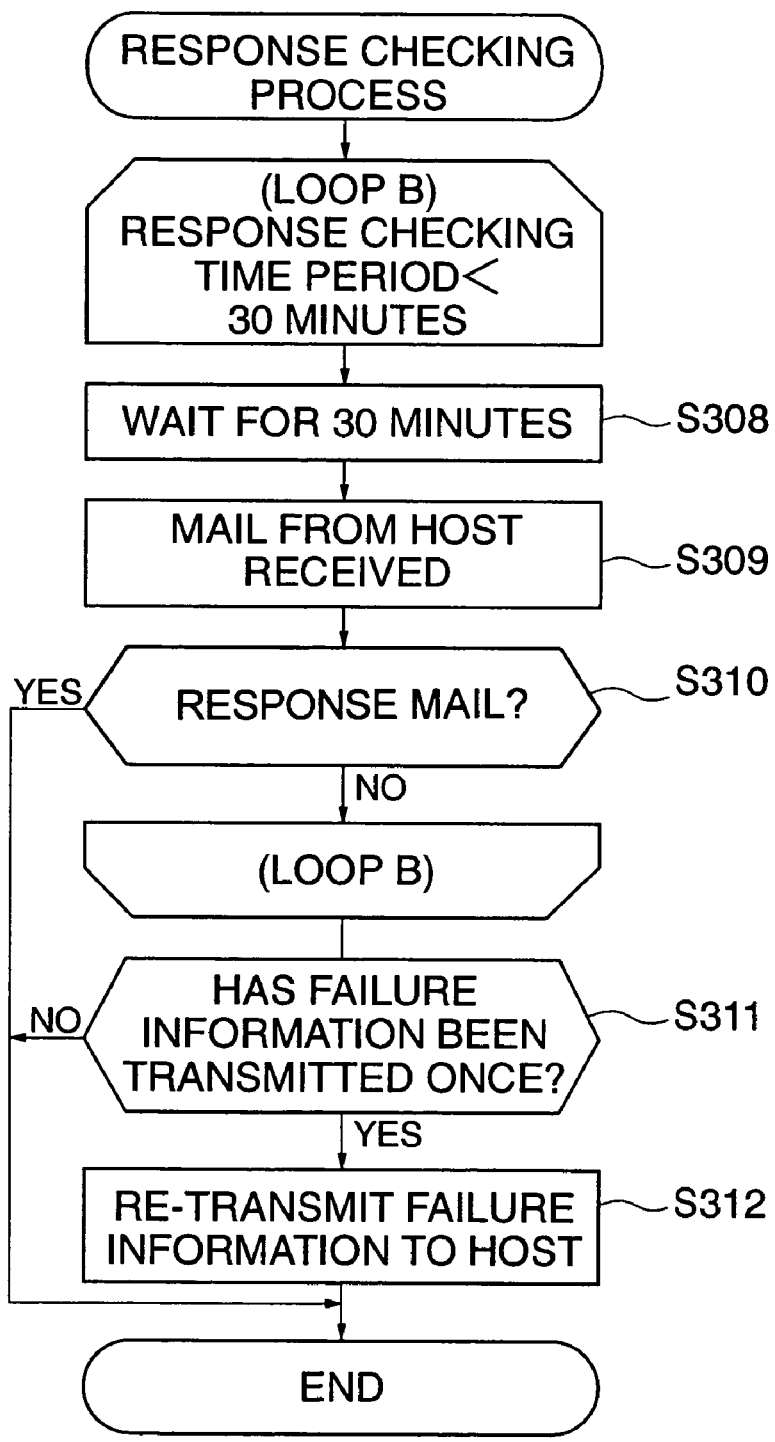
FIG. 4 is a flow chart showing a response checking process carried out in a step S304 in FIG. 3.

FIG. 3 is a flowchart showing a failure information checking process carried out by the monitoring apparatus 1 in FIG. 1. FIG. 4 is a flowchart showing a response checking process carried out by the monitoring apparatus 1. In the following description of the failure information checking process in FIG. 3 and the response checking process in FIG. 4, it is assumed that information is transmitted from the monitoring apparatus 1 to the terminal side management server 2, the center side management server 6 (hereinafter refereed to as "the host 6"), or the center side client PC 7 using SMTP (Simple Mail Transfer Protocol), and the monitoring apparatus 1 receives information using POP (Post Office Protocol).

In FIG. 3, the monitoring apparatus 1 starts a failure information checking program for checking for failure information of the devices 3, 4, and 5 to be monitored, and carries out processing in steps S301 to S305 for the devices 3, 4, and 5 to be monitored, thereby carrying out failure information checking processing at time intervals of one minute, for example. First, in the step S301, the monitoring apparatus 1 accesses the devices 3, 4, and 5 to be monitored via the LAN 9 to obtain failure information. If it is determined whether or not failure information has been acquired from the devices 3, 4, and 5 in the step S301, and if it is determined in the step S302 that failure information has been acquired, and the process proceeds to the step S303.

In the step S303, the monitoring apparatus 1 transmits the failure information acquired in the step S302 to the host 6. Then, in the step S304, the monitoring apparatus 1 carries out the response checking process (FIG. 4) for waiting for a response from the host 6. On the other hand, if the monitoring apparatus 1 determines in the step S302 that failure information has not been acquired from any of the devices 3, 4, and 5, the process proceeds to the step S305 wherein the monitoring apparatus 1 waits for one minute for checking for failure information at time intervals of one minute, and then the process returns to the step S301.

In FIG. 4, after transmitting the failure information to the host 6 in the step S303 in FIG. 3, the monitoring apparatus 1 carries out the response check process which is started in the step S304. The response checking process is configured such that upon receipt of failure information from the monitoring apparatus 1, the host 6 transmits information acknowledging the reception of the failure information by e-mail (hereinafter simply referred to as "mail") to the monitoring apparatus 1. In the response check process, the monitoring apparatus 1 waits for a response from the host 6 for 30 minutes at the maximum while repeating processing in the following steps S308 to S310 at time intervals of 30 seconds, for example, and transmits the failure information again to the host 6 only once if the response has not been received in that 30-minute time period.

In the step S308, the monitoring apparatus 1 waits for 30 seconds so as to carry out processing in the steps S308 to S310 at the time intervals of 30 seconds. Then, in the step S309, the monitoring apparatus 1 receives a mail from the host 6, and determines in the step S310 whether or not the received mail is a response mail indicating the reception of the failure information. If it is determined in the step S310 that the received mail is the response mail, the response checking process is terminated. On the other hand, if it is determined in the step S310 that the received mail is not the response mail, the process returns to the step S308 unless more than 30 minutes have elapsed after the start of the response checking program, or proceeds to a step S311 otherwise.

In the step S311, the monitoring apparatus 1 determines whether the number of times the monitoring apparatus 1 has transmitted the failure information to the host 6 is one or not. If the number of transmissions is not one, that is, the failure information has already been re-transmitted to the host 6, the process is terminated. On the other hand, if it is determined in the step S311 that the number of transmissions is one, that is, the failure information has not been re-transmitted to the host 6, the monitoring apparatus 1 re-transmits the failure information to the host 6 in a step S312. In this way, the failure information is re-transmitted only once.

Figure 5:
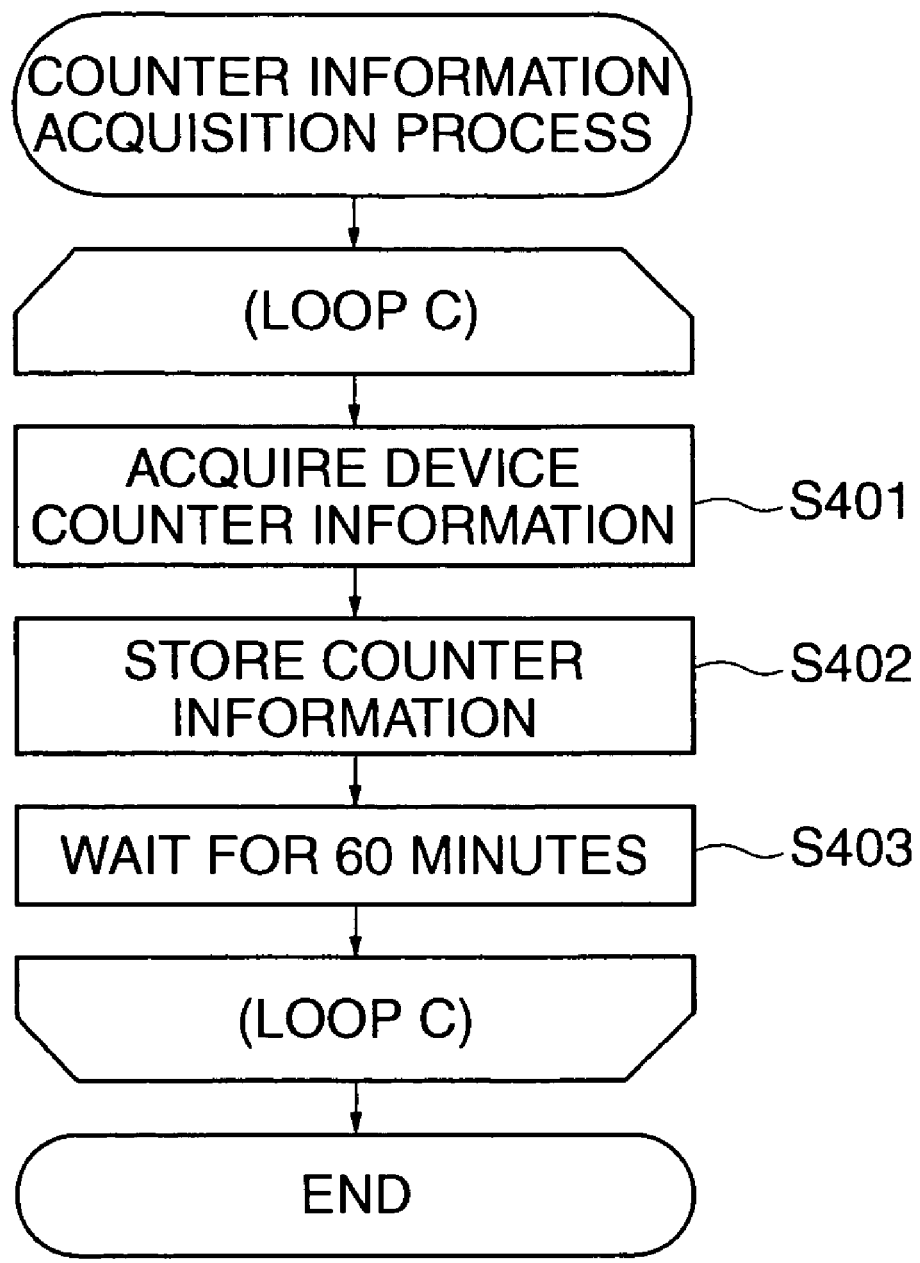
FIG. 5 is a flow chart showing a counter information acquisition process carried out by the monitoring apparatus.
Figure 6:
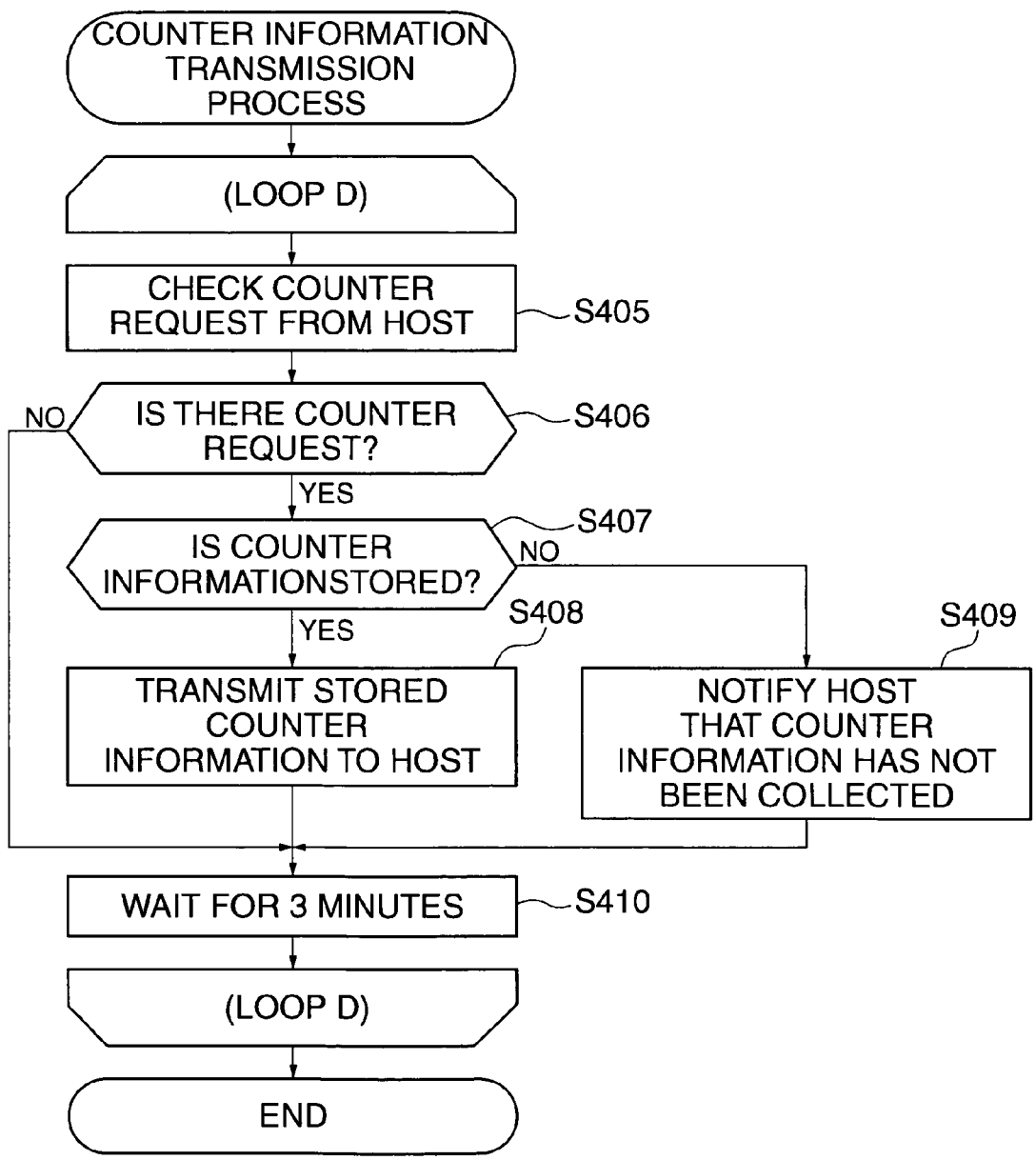
FIG. 6 is a flow chart showing a counter information transmission process carried out by the monitoring apparatus appearing.

FIG. 5 is a flow chart showing a counter information acquisition process in which the monitoring apparatus 1 acquires counter information of the devices 3 to 5 and the personal computers. FIG. 6 is a flowchart showing a counter information transmission process in which the monitoring apparatus 1 transmits counter information of the devices 3 to 5 and the personal computers to the host 6. In the present embodiment, counter information refers to information including part or all of the above-mentioned maintenance information of the devices 3 to 5 and the personal computers, and the processes in FIGS. 5 and 6 are carried out for each of the devices.

In the counter information acquisition process in FIG. 5, the monitoring apparatus 1 starts a counter information acquisition program for acquiring the counter information, to execute the following steps S401 to S403 for the devices 3, 4, and 5 to be monitored at time intervals of 60 minutes, for example, thereby preparing for a request from the host 6 for acquiring the counter information. First, in the step S401, the monitoring apparatus 1 acquires the counter information from each of the devices. Then, in the step S402, the monitoring apparatus 1 stores the counter information acquired from the devices in the step S401 in the flash ROM 204 to prepare for the request from the host 6 for the counter information. On this occasion, if the data format of the counter information acquired from the devices 3, 4, and 5 is different from the data format of the counter information transmitted to the host 6, the data may be converted when the counter information is stored. Alternatively, this data conversion may be carried out when the host 6 requests counter information. Then, in the step S403, the monitoring apparatus 1 waits for 60 minutes before carrying out the same processing for counter information acquisition 60 minutes later, and then the process returns to the step S401.

In FIG. 6, the monitoring apparatus 1 starts a counter information transmission program for transmitting counter information in response to a request from the host 6 for the counter information. The host 6 requests the counter information by transmitting a mail including a counter information request command to the monitoring apparatus 1. In the counter information transmission process, a mail from the host 6 is checked at time intervals of three minutes, for example, in preparation for a request for the counter information. In the counter information transmission process in FIG. 6, first, in a step S405, the monitoring apparatus 1 checks for a request from the host 6 for counter information. Then, it is determined in a step S406 whether or not a request for the counter information has been given, and the process proceeds to a step S410 if it is determined that the request has not been given. On the other hand, if it is determined in the step S406 that the request for the counter information has been given, the process proceeds to a step S407.

In the step S407, the monitoring apparatus 1 determines whether or not the counter information is stored by the above described counter information acquisition process in FIG. 5. If it is determined that the counter information is stored, the monitoring apparatus 1 transmits the stored counter information to the host 6 in a step S408. By execution of the counter information transmission process, the counter information transmitted from the monitoring apparatus 1 to the host 6 is shared by the center side client PC 7 as described above, so that an operator, for example, can refer to the counter information. On the other hand, if it is determined in the step S407 that counter information is not stored, the monitoring apparatus 1 notifies the host 6 that the counter information has not been collected (step S409). Then, in the step S410, the monitoring apparatus 1 waits for three minutes, for example, to check for a request from the host 6 for counter information at time intervals of three minutes.

In this way, the failure information checking process in FIG. 3, the response checking process in FIG. 4, the counter information acquisition process in FIG. 5, and the counter information transmission process in FIG. 6 make it possible to remotely and centrally manage the maintenance information of image forming apparatuses and devices such as personal computers used by the user.

Figure 7:
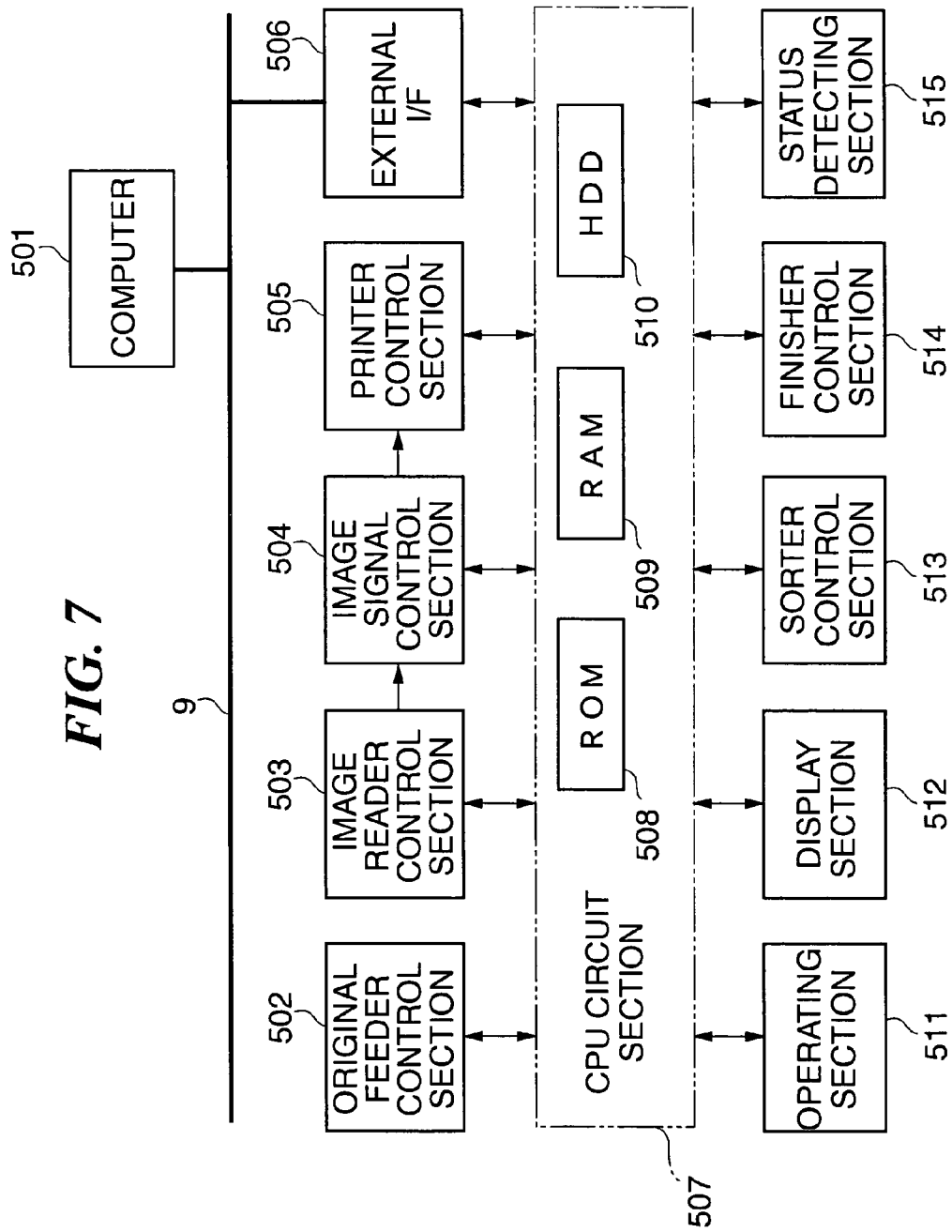
FIG. 7 is a block diagram showing the construction of a controller that controls the overall operation of an entire image forming apparatus which is an example of devices appearing in FIG. 1.

FIG. 7 is a block diagram showing an example of the construction of a controller that controls an entire image forming apparatus which is an example of the devices 3, 4, and 5 in FIG. 1. The controller of the image forming apparatus is comprised of an original feeder control section 502, an image reader control section 503, an image signal control section 504, a printer control section 505, an external I/F 506, a CPU circuit section 507, a sorter control section 513, a finisher control section 514, and a status detecting section 515. In FIG. 7, reference numeral 511 denotes an operating section of the image forming apparatus; 512, a display section of the image forming apparatus; and 501, the computer connected to the image forming apparatus via the LAN 9.

The CPU circuit section 507 is comprised of a CPU, not shown, a ROM 508, a RAM 509, and a hard disc drive (HDD) 510. The CPU controls the original feeder control section 502, the image reader control section 503, the image signal control section 504, the printer control section 505, the external I/F 506, the operating section 511, the display section 512, the sorter control section 513, the finisher control section 514, and the status detection section 515 in accordance with control programs stored in the ROM 508. The ROM 508 stores the control programs. The RAM 509 temporarily stores control data, and is also used as a working area for calculations required for the control. The hard disk drive 510 stores information required for the control programs, and information received from the original feeder control section 502 through the status detection section 515.

The original feeder control section 502 provides control to drive an original feeder, not shown, which automatically feeds an original set on an original stacking section to an original reading position according to an instruction from the CPU circuit 507. The image reader control section 503 provides control to drive a scanner unit, not shown, which scans an original, an image sensor, not shown, which photoelectrically converts an optical image of the original to an electric signal, and other like devices, thereby transmitting an analog image signal output from the image sensor to the image signal control section 504. The image signal control section 504 carries out various processing on a digital signal converted from the analog image signal, thereby converting this digital signal to a video signal, and outputs the video signal to the printer control section 505. The processing by the image signal control section 504 is controlled by the CPU control circuit 507.

The external I/F 506 carries out various kinds of processing on a digital image signal input from the computer 501 via the LAN 9 and a LAN interface, not shown, thereby converting the digital image signal to a video signal, and outputs the video signal to the printer control section 505. In addition, the external I/F 506 communicates with the monitoring apparatus 1 via the LAN 9 and the LAN interface, not shown. The printer control section 505 drives an exposure controller, not shown, which controls exposure of a photosensitive member based on the input video signal. The operating section 511 includes a plurality of keys for setting various functions relating to the image formation, and a display for displaying information indicating settings, and so forth. The operating section 511 outputs key signals corresponding to operations of the keys to the CPU circuit 507, and displays information corresponding to signals from the CPU circuit 507 on the display section 512.

The sorter control section 513 provides control to drive a sorter mechanism, not shown, for sorting sheets on which images have been formed. The finisher control section 514 provides control to drive a finisher mechanism, not shown, which carries out post processing on sheets, such as punching and stapling of sheets on which images have been formed. The sorter control section 513 and the finisher control section 514 operate based on signals from the CPU circuit section 507 according to inputs from a user via the external I/F 506 or settings input from the operating section 511. The state detecting section 515 collects status information from the various blocks shown in FIG. 7, carries out detections such as abnormality detection, carries out determinations based on the detection results, and notifies the CPU circuit section 507 of the determination results. According to this notification, the CPU circuit 507 displays abnormalities on the display section 512, and notifies the computer 501 and the like of the abnormalities via the external I/F 506.

Figure 8:
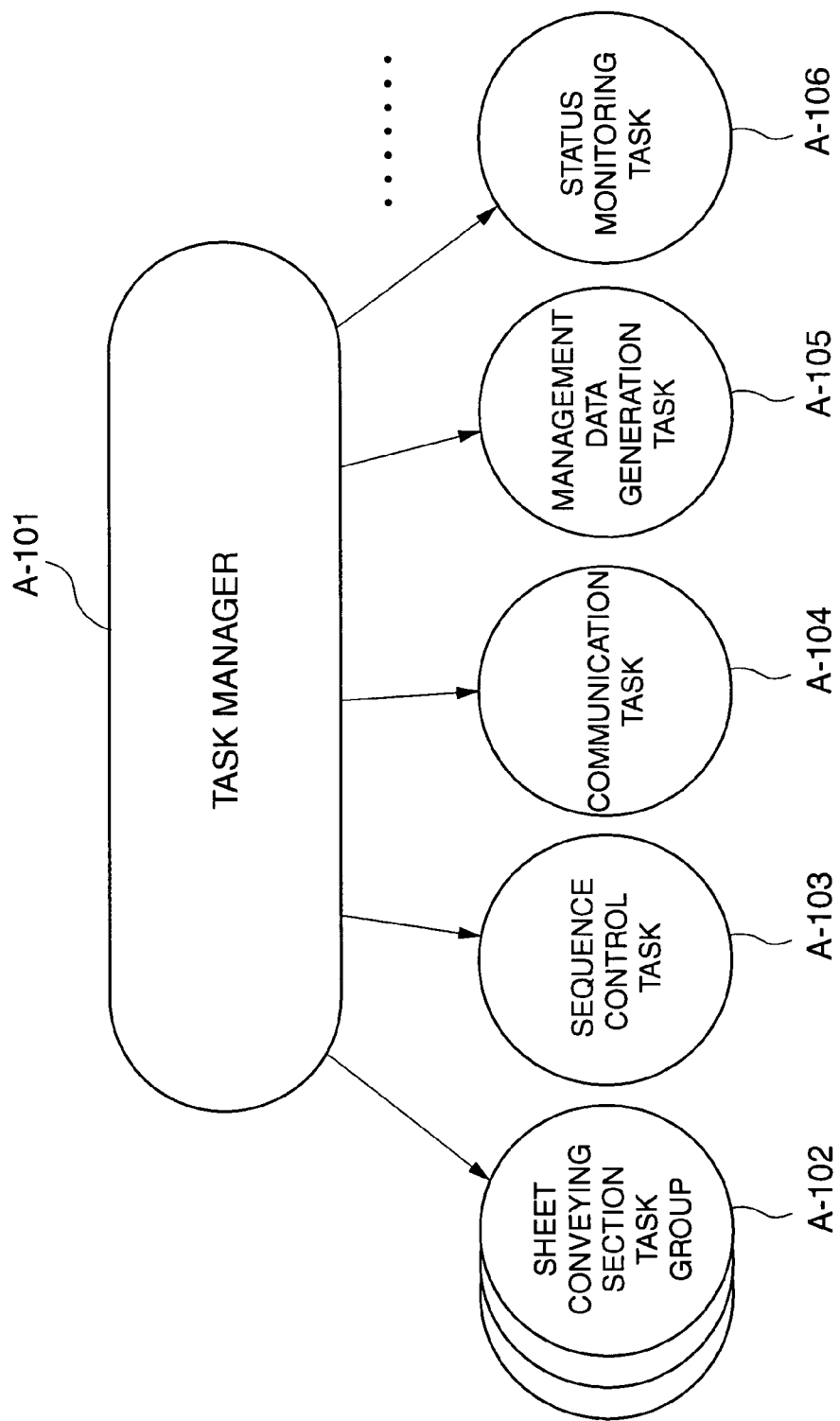
FIG. 8 is a diagram showing the software construction of the image forming apparatus in FIG. 7.

FIG. 8 is a block diagram showing the software construction of the image forming apparatus in FIG. 7. The image forming apparatus carries out a task manager A-101, a sheet conveying section task group A-102, a sequence control task A-103, a communication task A-104, a management data generation task A-105, and a status monitoring task A-106.

The task manager A-101 manages a plurality of tasks concurrently. The sheet conveying section task group A-102 is a group of tasks which manage the conveyance of originals and sheets on which images are to be formed. The sequence control task A-103 carries out management of the entire image forming apparatus. The communication task A-104 communicates with the monitoring apparatus 1.

The management data generation task A-105 generates data for the remote management of the present embodiment. The image forming apparatus counts the number of generations of the operation information for each sheet size, each processing mode, each sheet type, and each of black-and-white and color each time an image forming operation is carried out. The counting of the number of generations of the operation information is carried out by the management data generation task A-105, and the resulting counts are stored in the hard disk drive 510 of the image forming apparatus. In a similar manner, status information (failure information) relating to states such as jam, error, and alarm is stored in a predetermined data format in the hard disk drive 510 of the image forming apparatus. Further, there are provided counters (component part counters) for respective sections of the image forming apparatus, that indicate replacement cycles of consumable components, and degrees of usage of the consumable components, and the counts obtained by execution of the management data generation task A-105 are stored in the hard disk drive 510 of the image forming apparatus.

The status monitoring task A-106 detects abnormalities (jams, errors, and alarms) in the image forming apparatus, or detects status changes in predetermined devices, and when the status monitoring task A-106 detects an abnormality or a status change, status information in a predetermine format is stored in the hard disk drive 510 of the image forming apparatus.

Figure 9:
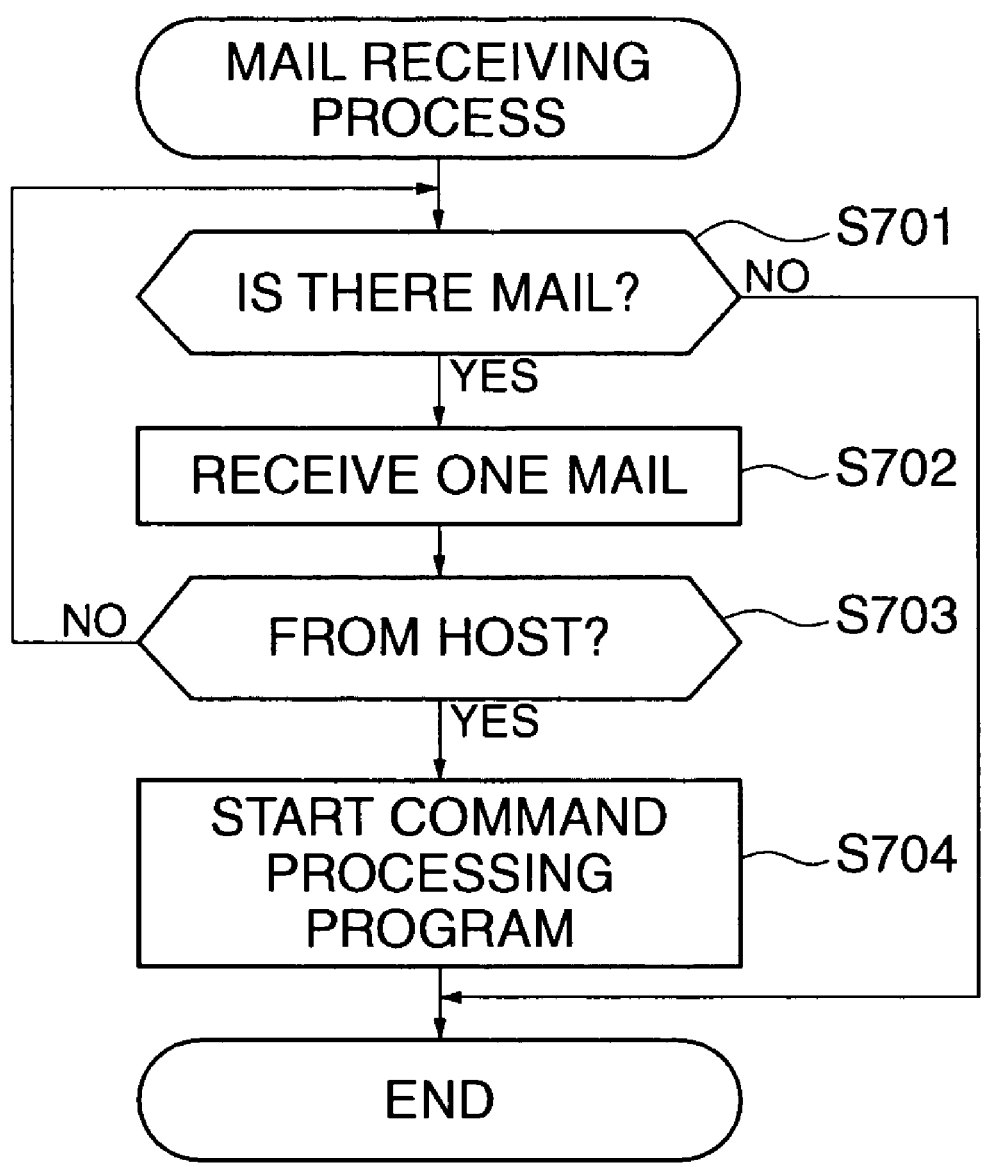
FIG. 9 is a flow chart showing an e-mail receiving process carried out by the monitoring apparatus.

FIG. 9 is a flow chart showing a mail receiving process in which the monitoring apparatus 1 in FIG. 1 receives a mail including an instruction from the host 6 and performs processing in accordance with the instruction. The mail receiving process is scheduled and started at regular time intervals, and is terminated upon receiving one mail from the host 6 or completing the receipt of all mails.

First, in a step S701, the monitoring apparatus 1 checks whether a mail has reached a mail server or not. If it is found in the step S701 that no mail has reached the mail server, the mail receiving process is terminated. If it is found in the step S701 that a mail has reached the mail server, the process proceeds to a step S702 wherein the monitoring apparatus 1 receives only one mail from the mail server. Then, in a step S703, the monitoring apparatus 1 determines whether or not the received mail is a mail from the host 6. In the present embodiment, the monitoring apparatus 1 recognizes a mail address of the host 6, and hence determines whether or not the received mail is one from the host 6 according to whether or not a sender's mail address is the same as the mail address of the host 6.

If it is determined in the step S703 that the received mail is not a mail from the host 6, the monitoring apparatus 1 determines that the received mail is a junk mail and discards it. The process then returns to the step S701 wherein the monitoring apparatus 1 receives the next mail. If it is determined in the step S703 that the received mail is a mail from the host 6, the monitoring apparatus 1 interprets an instruction (request) from the host 6 by decoding the mail. The process then proceeds to the step S704 wherein the monitoring apparatus 1 starts a processing program suitable for the instruction, and then the mail receiving process is terminated.

In the present embodiment, a module updating process and a version information acquiring process, described later, are also carried out in accordance with instructions contained in mails from the host 6. The module updating process and the version information acquiring process are carried out by starting an update command processing program (FIG. 11) and a version collecting processing program (FIG. 12) in response to mails received by the mail receiving process. The mail receiving process shown in FIG. 9 should not only be intended for executing processes shown in FIGS. 11 and 12, described later, but also for obtaining such an effect that various instructions can be given more easily from the host 6 as compared with the case where HTTP or FTP is used, since a mail addressed to a monitoring apparatus 1 can be more easily received in a user environment where the monitoring apparatus 1 is installed. Specifically, access to the monitoring apparatus 1 installed on the user side using HTTP or FTP may be blocked in terms of security, but this problem can be prevented by the process in FIG. 9.

Figure 10:
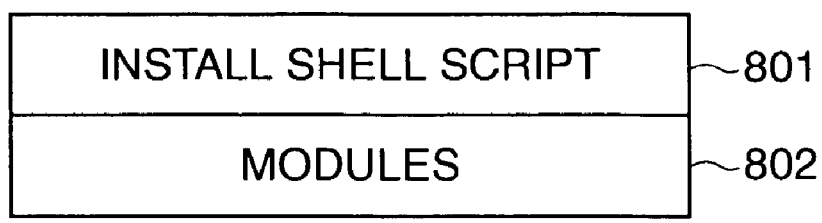
FIG. 10 is a diagram showing the format of data which is attached to a module update instruction command mail transmitted from the management apparatus in FIG. 1.

FIG. 10 is a view showing the format of data attached to a module update instruction command mail (e-mail) transmitted from the host 6. This command mail is for instructing update of modules in the monitoring apparatus 1, on which the monitoring apparatus 1 operates. The data is comprised of an install shell script 801 and modules (main body) 802 to which modules are to be updated (hereinafter referred to as the "updated modules"), and is compressed and encoded and attached to the module update instruction command mail. The install shell script 801 contains one or more commands executable by an operating system in the monitoring apparatus 1, including a command for providing conditional starting control, and is stored as a file in a storage section of the monitoring apparatus 1. The stored file is executed by the monitoring apparatus 1.

The install shell script 801 includes commands for preprocessing before installation, including a command for stopping a resident module and a command for stopping an update module; a copy command for storing the updated modules 802 in the monitoring apparatus 1; and commands for postprocessing such as restart after updating. It should be noted that the contents of the install shell script 801 differ according to attributes of the updated modules 802 (resident, nonresident, shared library, and so forth).

For example, a version acquisition program (described later with reference to FIG. 12) as a nonresident program which is started only when needed enables update of modules to be updated in timing in which the modules to be updated are not running (in the present embodiment, while the modules to be updated are running, the update of the modules fails, and hence update is repeatedly tried until the modules are successfully updated). The modules to be updated, which have not been started, will have been updated when they are started next time as the need arises, and hence, after the updated modules are started, they do not have to be restarted (post-processing).

Further, if data in a shared memory (the flash ROM 204) becomes unnecessary as a result of software module update and is desired to be discarded, or if predetermined modules are updated and a high stability in running the modules is to be obtained, the modules have to be restarted as post-processing.

Figure 11:
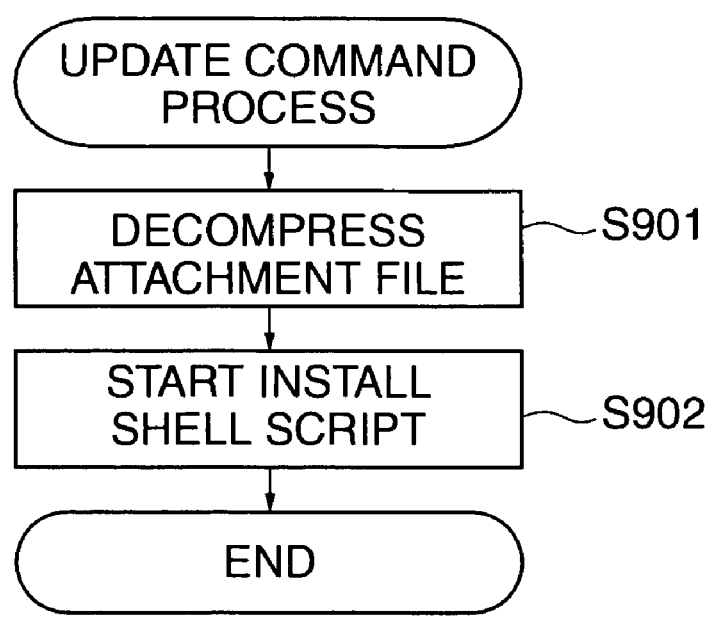
FIG. 11 is a flow chart showing an update command process as a command process carried out in response to the start of a command processing program in the e-mail receiving process in FIG. 9.

FIG. 11 is a flow chart showing an update command process as a command process carried out in response to the start of the command processing program in the mail receiving process in FIG. 9. The update command process in FIG. 11 is started when a mail including an module update instruction is received from the host 6 ("YES" to the step S703) and the received mail is interpreted as an update instruction in the FIG. 9 mail receiving process carried out by the monitoring apparatus 1.

In a step S901, the monitoring apparatus 1 decodes and decompresses a file, which is attached to the mail received from the host 6, on the RAM 203, and takes out therefrom the above described data comprised of the install shell script 801 and the modules 802 in FIG. 10. Then, in a step S902, the monitoring apparatus 1 starts the install shell script 801 to install the modules 802 (i.e. modules running in the monitoring apparatus 1 are updated to the modules 802). Examples of the resident modules include a device error monitoring module and a module for monitoring hang-up of a resident module. Then, according to the install shell script 801 installed in the step S902, the operations of resident and nonresident modules to be updated are stopped, and they are replaced by the respective updated modules (802 in FIG. 10).

The module updating process will now be described in further detail. For example, in the case where the monitoring apparatus 1 carries out an accounting process relating to charge for printing, such as collection or notification of counter information indicative of the number of prints, immediate updating of modules being used for the accounting process can impede smooth execution of the accounting process. To address this problem, in updating modules relating to an important process such as the accounting process, the modules are updated after they stop running.

In an alternative example, a processing command for causing the monitoring apparatus 1 to update modules to be updated immediately after the restart of the monitoring apparatus 1 in predetermined timing may be written in the install shell script 801.

Figures 12, 13:
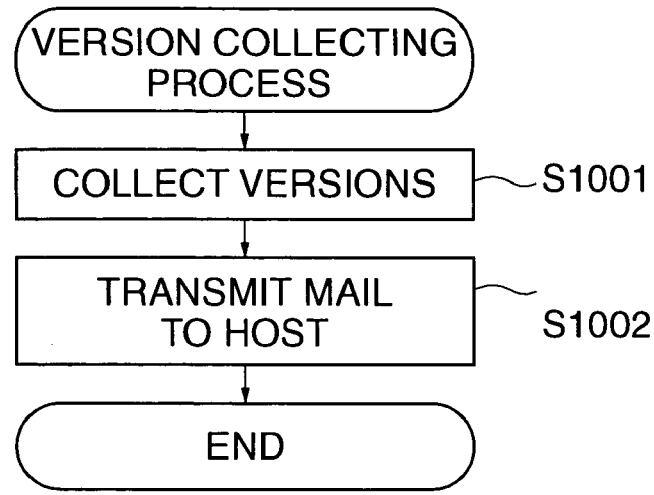
FIG. 12 is a flow chart showing a version collecting process as a command process carried out in response to the start of a command processing program in the e-mail receiving process in FIG. 9.
FIG. 13 is a diagram showing an example of a printout showing version information generated in accordance with the version collecting program in FIG. 12.

FIG. 12 is a flow chart showing a version collecting process as a command process carried out in response to the start of the command processing program in the mail receiving process in FIG. 9. The version collecting process is started in the step S704 when it is determined that a mail including a version information acquiring instruction is received from the host 6 (step S703) in the FIG. 9 mail receiving process carried out by the monitoring apparatus 1.

In a step S1001, the monitoring apparatus 1 collects individual version information indicative of versions of respective modules (programs, shell scripts, libraries, and so forth) stored in the monitoring apparatus 1 and entire version information indicative of the version of the monitoring apparatus 1 as a whole ("Software Version"), and generates data to be sent to the host 6 by return mail. In the present embodiment, it is assumed that the return mail data is in text format, and is printed into a format as shown in FIG. 13. The monitoring apparatus 1 attaches the version information generated in the step S1001 as a file to a mail, and sends it to the host 6.

FIG. 13 is a view showing an example of a print out showing the version information generated in the version collecting process in FIG. 12. Numerical values in a middle field 1102 indicate versions of items and modules in a left-hand field 1101. It should be noted that the representation of each version is comprised of an all-item common format part (e.g. 1.0.00 for "Software Version"), which is followed by a free description part (in a right-hand field) as needed. In the module updating process according to the present embodiment, whether or not modules have been successfully updated is automatically determined as described later. In making the determination, the versions of the respective modules are not taken into account, but only the value of "Software Version" on the first row is taken into account.

Specifically, when all the modules in the left-hand field 1101 in FIG. 13 have been successfully updated, version information indicative of the updated versions of the respective updated modules is held in the monitoring apparatus 1, and in the step S1001, the version information is collected to update the software version. Namely, if the latest version information is contained in a mail returned to the host 6 in the step S1002, this means that the software module has been successfully updated.

Further, the software version represents a combination of various modules written in the left-hand field 1101 in FIG. 13, and whether software in the monitoring apparatus 1 has been successfully updated or not can be determined only by referring to the software version without the necessity of comparing the versions of the respective modules.

For example, to notify the version information from the monitoring apparatus 1 to the host 6, a command for causing the monitoring apparatus 1 to voluntarily notify updated version information as an event notification to the host 6 after module update may be described in the install shell script 801 in FIG. 10. If it is configured such that the host 6 ascertains whether modules have been successfully updated or not using a mail from the monitoring apparatus 1, processing loads on the host 6 can be further reduced compared with the case where the monitoring apparatus 1 voluntarily connects to the host 6 and notifies the host 6 of whether modules have been successfully updated or not.

Figure 14:
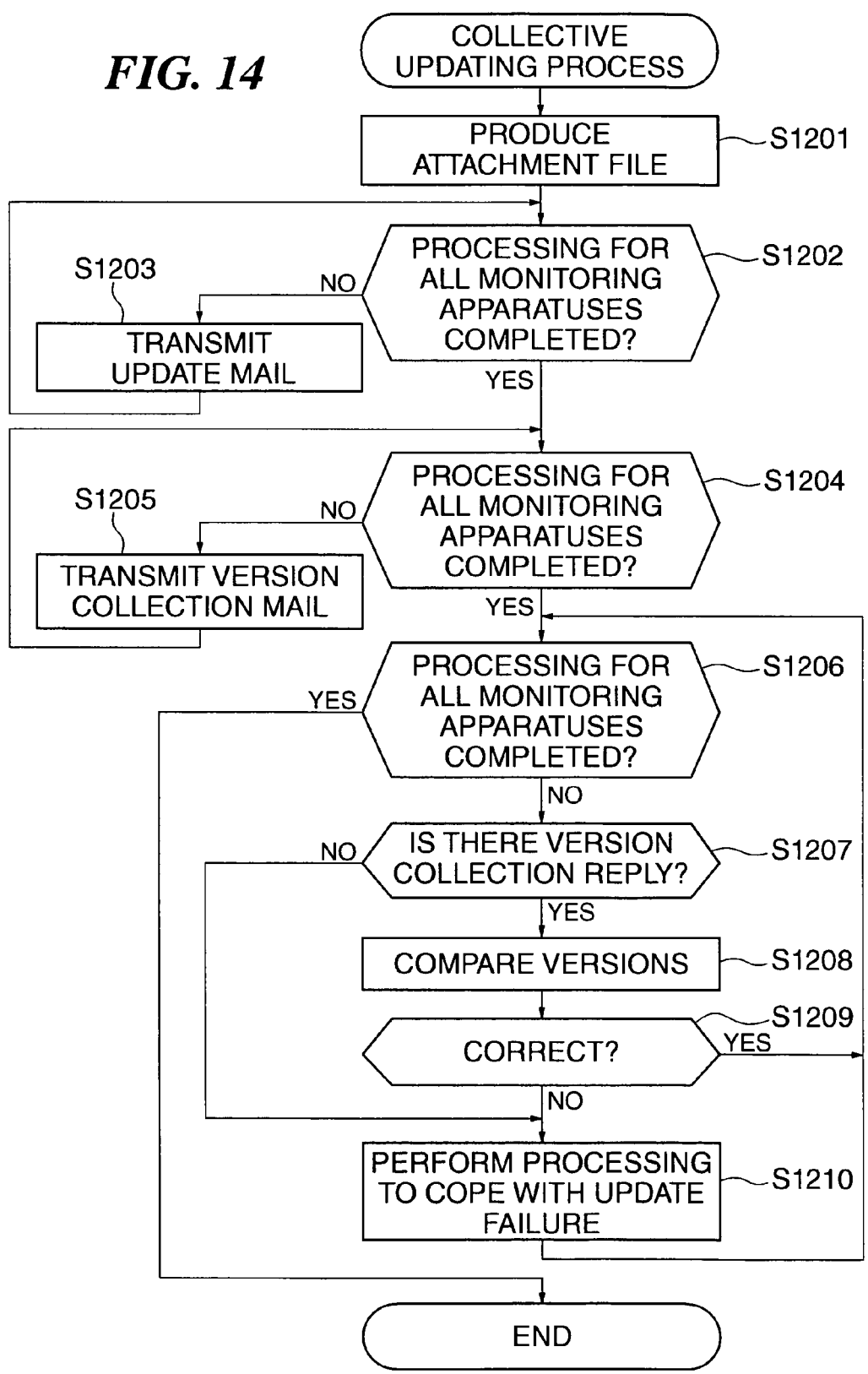
FIG. 14 is a flow chart showing a collective updating process for collectively updating modules in the monitoring apparatus.

FIG. 14 is a flow chart showing a collective updating process in which modules in one or more monitoring apparatuses 1 managed by the host 6 are collectively updated at the initiative of the host 6 side including the host 6. FIG. 15 is a view showing a screen of the center side client PC 7 before the start of an uploading process in a collective updating program which operates on the center side client PC 7 connected to the host 6, for carrying out the collective updating process in FIG. 14.

A list of monitoring apparatuses 1, whose modules are to be updated and which is managed by the host 6, is displayed in a window 1301. Although not shown in detail in FIG. 15, a function of deleting/adding a management apparatus 1 whose modules are to be updated to the list is provided so as to cope with the case where modules within all the monitoring apparatuses 1 managed by the host 6 are not updated in the same manner. Reference numeral 1302 indicates a present software version of each monitoring apparatus 1. Reference numeral 1303 indicates a date on which the latest version information was acquired from each monitoring apparatus 1. In the present embodiment, version information is necessarily acquired after each monitoring apparatus 1 is installed or after modules in each monitoring apparatus 1 are updated, and hence versions and dates indicated by 1302 and 1303, respectively, are the latest information on the respective monitoring apparatuses 1. Reference numeral 1304 indicates a value indicative of a software version to which modules in each monitoring apparatus 1 are to be updated.

In a step S1201, the host 6 produces an attachment file for module update described with reference to FIG. 10. Then, in a step S1203, the host 6 transmits a mail which contains a module updating instruction and to which is attached the attachment file for update produced in the step S1201 to all the monitoring apparatuses 1 whose modules are to be updated and which are managed by the host 6. In a step S1202, the host 6 determines whether processing in the step S1203 has been completed for all the monitoring apparatuses 1 whose modules are to be updated.

Next, in a step S1205, the host 6 transmits a mail including a version information acquiring instruction to all the monitoring apparatuses 1 whose modules are to be updated and which are managed by the host 6. In a step S1204, the host 6 determines whether processing in the step S1205 has been performed for all the monitoring apparatuses 1 whose modules are to be updated. It should be noted that the version information acquiring process is intended for acquiring the status of each monitoring apparatus 1 after update processing. Therefore, the version information acquiring process has to be carried out upon the lapse of a sufficient period of time within which each monitoring apparatus 1 receives a mail including an updating instruction and completes update. This sufficient period of time differs according to modules since pre-processing and post-processing for update are different.

As described with reference to FIG. 10, if post-processing such as restart of updated modules is performed and the measured restart time period is 10 minutes, the host 6 issues the mail including the version information acquiring instruction to the monitoring apparatus 1 upon the lapse of 10 minutes or longer. The period of time for which the host 6 waits until the issuance of the mail including the version information acquiring instruction depends on the version of updated modules, and namely differs according to what kinds of processing (post-processing and pre-processing) are included in update modules of predetermined versions. As shown in FIGS. 15 and 16, various versions of modules in various monitoring apparatuses 1 are managed by the host 6, and to update modules within the respective monitoring apparatuses 1, the host 6 adopts different time periods according to versions of the modules.

Next, in steps S1206 to S1210, the host 6 ascertains whether modules within each monitoring apparatus 1 have been successfully updated or not. Specifically, in the step S1206, the host 6 determines whether processing in the steps S1207 to S1210 has been performed for all the monitoring apparatuses 1 whose modules are to be updated. If it is found in the step S1207 that there is no reply to the version information acquisition request transmitted in the step S1205, it is impossible to determine whether modules have been successfully updated or not, and hence it is determined that update processing has failed. The process then proceeds to the step S1210. If it is found in the step S1207 that there is a reply to the version information acquisition request transmitted in the step S1205, the process proceeds to the step S1208.

In the step S1208, the host 6 compares the value of a software version ("Software Version" in FIG. 13) in the acquired information with a software version 1304 (FIG. 15) to which modules in each monitoring apparatus 1 should be updated by update processing. If as a result of the comparison in the step S1208, it is determined in the step S1209 that modules have been successfully updated, the process returns to the step S1206, and then the host 6 performs processing in the steps S1207 to S1210 for the other monitoring apparatus 1 whose modules are to be updated. If as a result of the comparison in the step S1208, it is determined in the step S1209 that modules have not been successfully updated, the process proceeds to the step S1210. In the step S1210, to cope with the failure in update, the host 6 stores information identifying the monitoring apparatus 1 whose modules have not been successfully updated.

FIG. 16 is a view showing a screen displayed on the center side client PC 7 shown in FIG. 15 after the process in FIG. 14 is carried out for all the monitoring apparatuses 1 whose modules are to be updated. In a window 1401, reference numeral 1402 indicates versions after update obtained in the step S1205, and reference numeral 1403 indicates dates on which version information was acquired in the step S1205. The monitoring apparatuses 1 which has failed in uploading and for which the step S1210 has been executed are checked off in a field indicated by reference numeral 1405 to clearly indicate a failure in update. The present software version 1402 of these monitoring apparatuses 1 is different from the software version 1404 which should be taken after update.

Although in the present embodiment, a failure in uploading is only indicated in the window 1401 in FIG. 16, the present invention is not limited to this, but update for a corresponding monitoring apparatus 1 may be automatically retried according to information (information identifying the monitoring apparatuses 1 which has failed in uploading) stored in the step S1210.

As described above, according to the present embodiment, when receiving a module update instructing mail from the host 6 (the center side management server 6), the monitoring apparatus 1 updates running modules to received modules, and when receiving a version information acquisition requesting mail from the host 6, the monitoring apparatus 1 collects version information on the modules and sends the collected version information to the host 6 by return mail. Therefore, it is possible to efficiently update modules within the monitoring apparatus 1 by remote control from the host 6. This eliminates the necessity of carrying out such a complicated operation that the host connects to the monitoring apparatuses one by one to update modules therein as in the prior art.

Further, the host 6 collectively transmits a module update instructing mail including at least modules to be updated and an install shell script to the monitoring apparatuses, and collectively transmits a version information acquisition requesting mail for requesting acquisition of individual version information indicative of respective versions of modules in each monitoring apparatus 1 and entire version information indicative of the version of each monitoring apparatus 1 as a whole to the monitoring apparatuses 1. The host 6 receives the version information as a reply from each monitoring apparatus 1. Therefore, it is possible to remotely and collectively update modules in a plurality of monitoring apparatuses managed by the host. This eliminates the necessity of carrying out such a complicated and a large volume of operation that the host connects to the monitoring apparatuses one by one and update modules therein as in the prior art.

Further, after giving an instruction for updating modules, the host 6 gives an instruction for acquiring version information and acquires version information, and compares a version to which the modules should be updated with the acquired version information to ascertain whether the modules have been successfully updated or not. Therefore, the host 6 can automatically determine whether modules in each monitoring apparatus 1 managed by remote control have been successfully updated or not. As a result, it is possible to properly manage the status of update in each monitoring apparatus 1.

Although in the above described embodiment of the present invention, the device remote monitoring system is constructed as shown in FIG. 1, the present invention is not limited to this, but the numbers of monitoring apparatuses, center side management servers, terminal side management servers, devices, and so forth to be installed, the network arrangement, and the types of devices to be monitored may be arbitrarily determined.

Further, it goes without saying that the object of the present invention may also be accomplished by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and hence the program code and a storage medium on which the program code is stored constitute the present invention.

Examples of the storage medium for supplying the program code include a RAM, a floppy (registered trademark) disk, a hard disk, an optical disk, a magneto optical disk, a CD-ROM, a CD-R, a CD-RW, a DVD-ROM, a DVD-RAM, a DVD-RW, a DVD+RW, a magnetic tape, a nonvolatile memory card, a ROM, and an EEPROM. The program code may be downloaded via a network.

Further, it goes without saying that the functions of the above described embodiment may be accomplished not only by executing the program code read out by a computer, but also by causing an OS (operating system) or the like which operates on the computer to perform a part or all of the actual operations based on instructions of the program code.

Further, it goes without saying that the functions of the above described embodiment thereof may be accomplished by writing the program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. A monitoring apparatus for acquiring information by communication from at least one image forming apparatus to be monitored and communicating with a management apparatus, the monitoring apparatus comprising:

an e-mail unit that carries out communication with the management apparatus by e-mail;

a receiving unit that receives an update instruction e-mail containing second modules for updating first modules, on which the monitoring apparatus operates, and an install script thereof;

a processing unit operable when said receiving unit has received an update instruction e-mail containing the second modules and the install script, to automatically update the first modules in operation to the second modules corresponding to description of the install script, so that the management apparatus enables the first modules of the monitoring apparatus to update to the second modules with the update instruction e-mail, wherein said processing unit starts the updating at first timing when said first modules does not start in accordance with the description of the install script, second timing when said first modules are caused to stop, third timing when said first module finishes executing, and fourth timing when said monitoring apparatus has just restarted;

an information collecting unit that collects version information on the first modules when said e-mail unit has received a version information acquisition request from the management apparatus by e-mail; and a returning unit that sends the version information collected by said information collecting unit to the management apparatus by return e-mail, so that the management apparatus enables to determine with the return e-mail whether or not the first modules in operation is updated.

2. A control method executed by a monitoring apparatus that acquires information by communication from at least one image forming apparatus to be monitored, and communicates with a management apparatus, the method comprising:

an e-mail step of carrying out communication with the management apparatus by e-mail;

a receiving step of receiving an update instruction e-mail containing second modules for updating first modules, on which the monitoring apparatus operates, and an install script thereof;

a processing step of automatically updating the first modules in operation to the second modules corresponding to description of an install script, so that the management apparatus enables the first modules of the monitoring apparatus to update to the second modules with the update instruction e-mail, when said receiving step has received an update instruction e-mail containing the second modules for updating the first modules and the install script in said receiving step, wherein said processing step starts the updating at first timing when said first modules does not start in accordance with the description of the install script, second timing when said first modules are caused to stop, third timing when said first module finishes executing, and fourth timing when said monitoring apparatus has just restarted;

an information collecting step of collecting version information on the first modules when said e-mail step has received a version information acquisition request from the management apparatus by e-mail; and a returning step of sending the version information collected by said information collecting unit to the management apparatus by return e-mail, so that the management apparatus enables to determine with the return e-mail whether or not the first modules in operation is updated.

* * * * *